(12) United States Patent
Harada et al.

(10) Patent No.: US 7,488,270 B2
(45) Date of Patent: Feb. 10, 2009

(54) TOROIDAL CONTINUOUSLY VARIABLE TRANSMISSION AND METHOD FOR PRODUCING TORQUE TRANSMITTING MEMBER THEREOF

(75) Inventors: Hisashi Harada, Kashiwara (JP); Yoshihiro Ono, Gose (JP)

(73) Assignee: Koyo Seiko Co., Ltd., Osaka (JP)

( * ) Notice: Subject to any disclaimer, the term of this patent is extended or adjusted under 35 U.S.C. 154(b) by 1250 days.

(21) Appl. No.: 10/615,371

(22) Filed: Jul. 9, 2003

(65) Prior Publication Data

US 2008/0009386 A1 Jan. 10, 2008

(30) Foreign Application Priority Data

Jul. 11, 2002 (JP) ............................... 2002-202962

(51) Int. Cl.
*F16H 15/38* (2006.01)
(52) U.S. Cl. ............................... 476/73; 476/40; 476/42
(58) Field of Classification Search ................... 476/40, 476/42, 46, 72, 73; 148/318, 319, 334, 335; 384/492, 625, 912, 913
See application file for complete search history.

(56) References Cited

U.S. PATENT DOCUMENTS

| | | | |
|---|---|---|---|
| 5,556,348 A | 9/1996 | Kokubu et al. | |
| 5,626,974 A | 5/1997 | Mitamura | |
| 5,735,769 A | 4/1998 | Takemura et al. | |
| 6,540,847 B1 * | 4/2003 | Beswick | 148/334 |

FOREIGN PATENT DOCUMENTS

| | | |
|---|---|---|
| JP | 8-210360 | 8/1996 |
| JP | 09-105415 | 4/1997 |
| JP | 11-80896 | 3/1999 |
| JP | 2000-282178 | 10/2000 |
| JP | 2000-310307 | 11/2000 |
| JP | 2001-32900 | 2/2001 |
| JP | 2001-50282 | 2/2001 |
| JP | 2001-98343 | 4/2001 |
| JP | 2001-152252 | 6/2001 |

OTHER PUBLICATIONS

European Search Report ; Application No. EP 03 01 5819 (May 30, 200).
JP 2000310307 Abstract ( Nov. 7, 2000).

* cited by examiner

*Primary Examiner*—William C Joyce
(74) *Attorney, Agent, or Firm*—Smith, Gambrell & Russell, LLP

(57) ABSTRACT

In a toroidal continuously variable transmission, rolling contact portions of an input disc 4, an output disc 7, and roller 13 are formed of bearing steel, which contains C: 0.8-1.5 wt %; Si: 0.5-2.5 wt %; Mn: 0.3-2.0 wt %; Cr: 1.9-2.5 wt %; Mo: 0.3-1.0 wt %; and a total of 1.0 wt % or more of Si and Mo; with the balance being iron and unavoidable impurities. A residual austenite in a range of depth Z=1.0L, where L is the major axis of a contact ellipse of the traction contact portion, from the surface of the rolling contact portion is 15 wt % or less, and the hardness of the range is HRC 58-62 by tempering a blank with a predetermined shape at a temperature of 250° C. or more after quenching the blank.

9 Claims, 4 Drawing Sheets

(a)

(b)

(a)

(b)

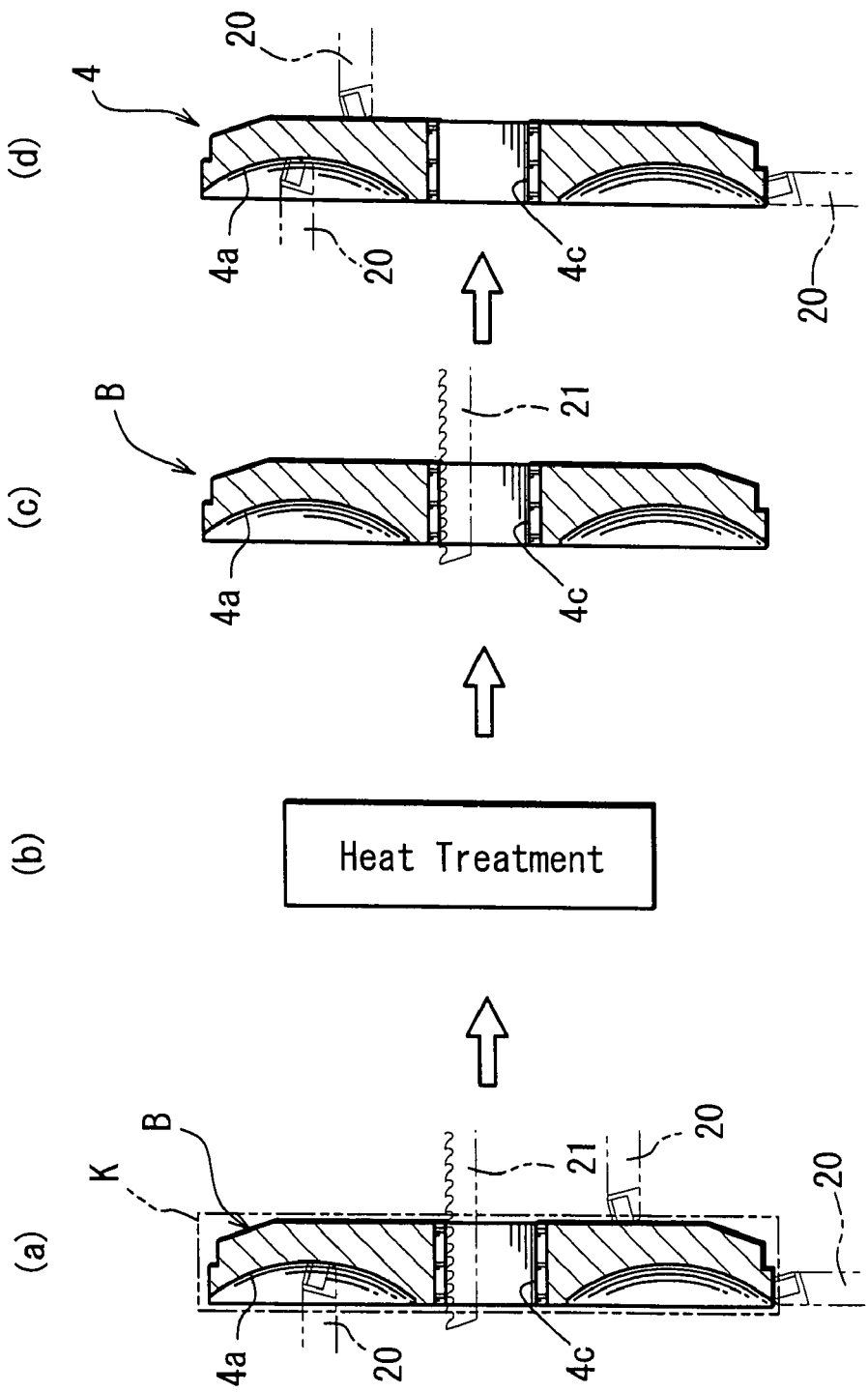

TOROIDAL CONTINUOUSLY VARIABLE TRANSMISSION AND METHOD FOR PRODUCING TORQUE TRANSMITTING MEMBER THEREOF

BACKGROUND OF THE INVENTION

This invention relates to a toroidal continuously variable transmission and a method for producing torque a transmitting member thereof.

In a toroidal continuously variable transmission for an automotive vehicle etc., a plurality of rollers are rotatably sandwiched between raceway portions of an input disc and an out put disc opposing each other by a predetermined force. Such a toroidal continuously variable transmission transmits torque between the discs by a traction force between the circumference of the roller and each raceway portion of the disc. This toroidal continuously variable transmission can increase and decrease the number of revolutions of the output disc against the input disc (transmission ratio) by adjusting the position of the roller with respect to each disc.

In the toroidal continuously variable transmission, each of rolling contact portions of the input disc, the output disc and the rollers, which are torque transmitting members, suffers high temperatures and high surface pressure in operation. For this reason, not only a black structure caused by conventional fatigue but also a white structure causing white layer flaking is occurred at the rolling contact portions. This causes a problem that its life is shortened. Some technologies trying to solve such a problem are known as follows:

(1) In order to increase fatigue resistance, the production process comprises performing carburization treatment on a mechanical structural steel containing Cr so that the material member has a surface carbon density within a range of 0.6-1.5% by weight; precipitating carbide by holding the carburized material member at an upper limit temperature which is calculated based on the alloy content; and quenching after holding at a temperature at which austenite phase is formed, and the mechanical structural steel includes a matrix having at least one of martensite structure and bainite structure. The matrix contains carbide, which includes $M_{23}C_6$ type carbide, having a mean particle size of 3 µm or less, dispersed and precipitated in form of at least one of generally spheres and pseudo-spheres (see, for example Japanese Patent Laid-Open Publication No. 2001-98343).

(2) In order to reduce the occurrence of the structural change, the amount of residual austenite in steel is set to 10% or less (see, for example Japanese Patent Laid-Open Publication No. 1996-210360).

(3) In order to reduce a temperature rise by reducing rolling friction, the amount of residual austenite in steel is set to not less than 0.05% and less than 10%. This also tries to prevent a plastic deformation caused by the decomposition of residual austenite at a rolling contact surface (see, for example Japanese Patent Laid-Open Publication No. 1997-105415).

(4) An alloy steel material, which contains C: 0.15-0.5 wt %, Si: 0.1-1.5 wt %, Mn: 0.1-1.5 wt %, Cr: 0.5-3.0 wt %, and Mo: 0.1-3.0 wt %, a content of O in the alloy steel material being set to be not more than 9 ppm, which surface after carbonitriding, hardening and tempering treatments is set to contain C: 0.8-1.2 wt % and N: 0.05-0.20 wt %, and which surface hardness is Hv 720 or more, and in which Mo or V carbide/carbonitride, the average particle size of which is in a range of from 50 nm to 500 nm, is dispersed and precipitated on a race surface or in a range of from the race surface to a deep position where a maximum shearing stress is generated, is used (see, for example Japanese Patent Laid-Open Publication No. 2001-32900).

However, there is a problem that any of the technologies mentioned above does not sufficiently achieve the effect and its cost is high.

It is an object to provide a toroidal continuously variable transmission and a method for producing a torque transmitting member thereof capable of long life at low cost.

SUMMARY OF THE INVENTION

A toroidal continuously variable transmission according to the present invention comprises an input disc having a concavely curved raceway portion in one side, an output disc having a concavely curved raceway portion opposing the raceway portion of the input disc in one side, and a roller rotatably sandwiched between the raceway portions of the discs for transmitting torque between the discs by a traction force between the circumference of the roller and the raceway portion of each of the discs, wherein, at least the rolling contact portion of at least one transmitting member of the input disc, the out put disc and the roller is formed of a bearing steel which contains: C: 0.8-1.5 wt %; Si: 0.5-2.5 wt %; Mn: 0.3-2.0 wt %; Cr: 1.9-2.5 wt %; Mo: 0.3-1.0 wt %; and a total of 1.0 wt % or more of Si and Mo; with the balance being iron and unavoidable impurities; wherein, a residual austenite in a range of depth Z=1.0L, where L is the major axis of a contact ellipse of the traction contact portion, from the surface of the rolling contact portion is 15 wt % or less, and the hardness of the range is HRC 58-62.

In the toroidal continuously variable transmission mentioned above, since the residual austenite in the range of depth Z=1.0L from the surface of the rolling contact portion formed of the bearing steel is 15 wt % or less, and the hardness of the range is HRC 58-62, this can reduce the occurrence of a white structure, which is a factor of a short life. Thus, a long-life toroidal continuously variable transmission can be obtained at low cost. The inventors of the present invention found that adjusting the amount of residual austenite and the hardness of the predetermined depth from the surface of the rolling contact portion formed of the bearing steel can reduce the occurrence of a white structure based on their studies, and accomplished this invention.

It is preferable that an oxide particle size is less than 20 µm in the range of depth Z=1.0L, in the range of depth Z=1.0b, where b is the minor axis of the contact ellipse of the traction contact portion, or in the range of depth Z=0.4b-0.5b from the surface, of the rolling contact portion formed of the bearing steel, respectively. In this case, since the oxide particle size in the rolling portion is small, it is capable of reducing occurrence of flaking caused by the oxide particle as a source.

Another toroidal continuously variable transmission according to the present invention comprises an input disc having a concavely curved raceway portion in one side, an output disc having a concavely curved raceway portion opposing the raceway portion of the input disc in one side, and a roller rotatably sandwiched between the raceway portions of the discs for transmitting torque between the discs by a traction force between the circumference of the roller and the raceway portion of each of the discs, wherein, at least a rolling contact portion of at least one transmitting member of the input disc, the out put disc and the roller is formed of a bearing steel which contains: C: 0.8-1.5 wt %; Si: 0.5-2.5 wt %; Mn: 0.3-2.0 wt %; Cr: 1.9-2.5 wt %; Mo: 0.3-1.0 wt %; and a total of 1.0 wt % or more of Si and Mo; with the balance being iron and unavoidable impurities; wherein, a residual austenite in a range of depth Z=1.0L, where L is the major axis of a contact ellipse of the traction contact portion, from the surface of the rolling contact portion is 7-13 wt %, and the hardness of the range is HRC 59-61, and an oxide particle size in the range is 14-19 μm.

In such a toroidal continuously variable transmission, since the residual austenite in the range of depth Z=1.0L from the surface of the rolling contact portion formed of the bearing steel is 7-13 wt %, and the hardness of the range is HRC 59-61, and an oxide particle size in the range is 14-19 μm, this can reduce the occurrence of a white structure, which is a factor of a short life. Thus, a long-life toroidal continuously variable transmission can be obtained at low cost.

It is preferable that an oxide particle size is less than 20 μm in the range of depth Z=1.0L, in the range of depth Z=1.0b, where b is the minor axis of the contact ellipse of the traction contact portion, or in the range of depth Z=0.4b-0.5b from the surface of the rolling contact portion formed of the bearing steel, respectively. In this case, since the oxide particle size in the rolling portion is small, it is capable of reducing occurrence of flaking caused by the oxide particle as a source.

In both of the toroidal continuously variable transmissions mentioned above, the whole of the input disc, the whole of the output disc, and the whole of the roller can be formed of the bearing steel, and the toroidal continuously variable transmission is a full-toroidal. In this case, a long-life full-toroidal continuously variable transmission can be obtained at low cost.

A method for producing the torque transmitting member according to the present invention, comprises steps forming a predetermined shape of blank formed of the bearing steel; tempering the blank at a temperature of 250° C. or more after quenching; and finishing the heat-treated blank.

This method can provide the torque transmitting member with a residual austenite in a range of depth Z=1.0L, where L is the major axis of a contact ellipse of the traction contact portion, from the surface of the rolling contact portion is 15 wt % or less, and the hardness of the range is HRC 58-62 only by tempering a blank at the above temperature. Thus, this method can provide a long-life rolling contact portion at low cost.

BRIEF DESCRIPTION OF THE DRAWINGS

FIG. 4 is a diagram showing processes of a method for producing a torque transmitting member.

DETAILED DESCRIPTION OF THE PREFERRED EMBODIMENT

Figure 1:
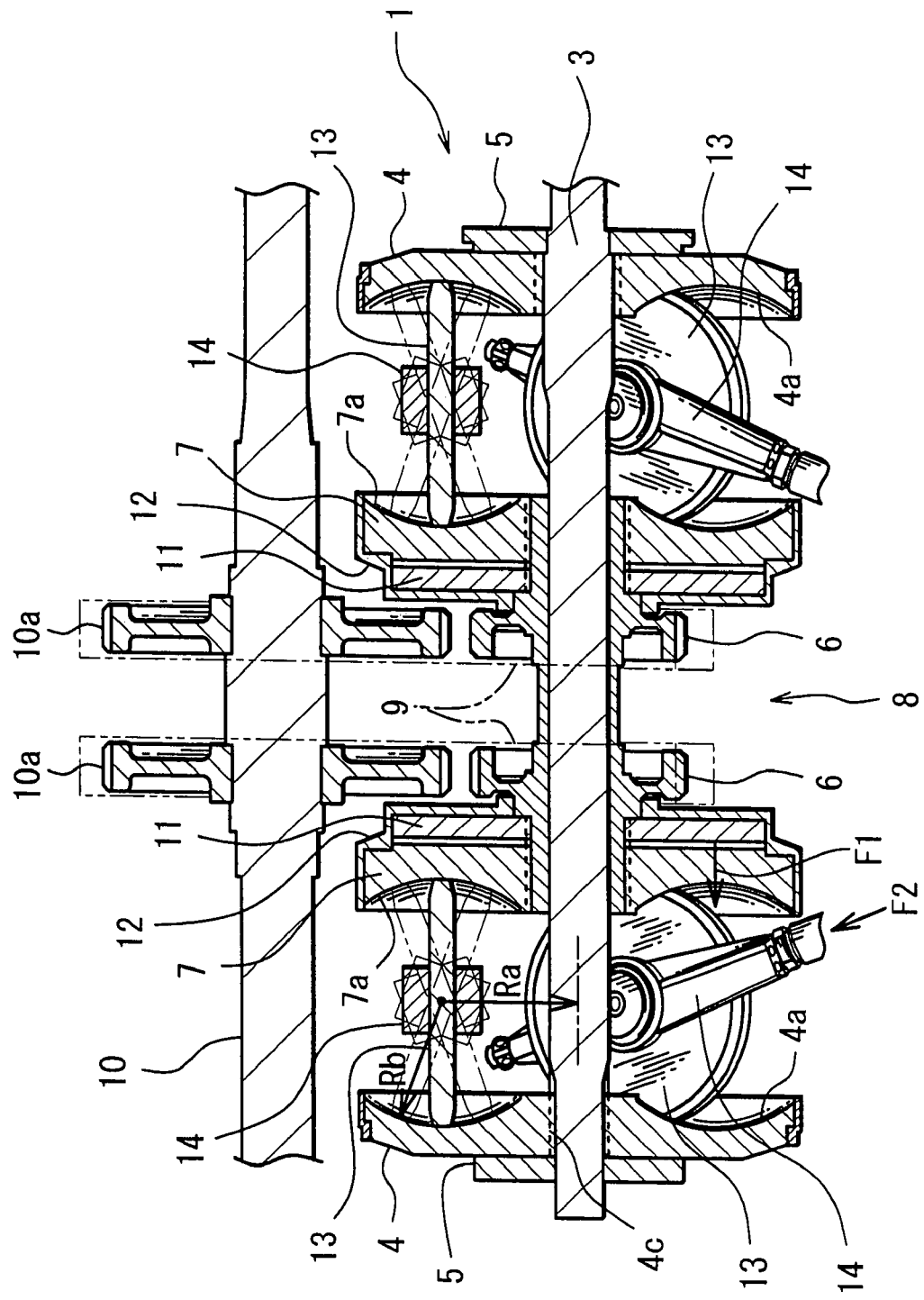
FIG. 1 is a schematic diagram showing a toroidal continuously variable according to the present invention.

FIG. 1 is a schematic diagram showing a full-toroidal continuously variable transmission as an embodiment of a toroidal continuously variable transmission according to the present invention. A variator 1 as the principal part of the toroidal continuously variable transmission has an input shaft 3 to which rotational power is transmitted from an output shaft of an engine (not shown). Input discs 4 as torque transmitting members are arranged at positions in proximity to both ends of the input shaft 3 by spline coupling so as to be rotatable as one-piece. A concavely curved raceway portion 4a is formed in one side of each input disc 4. Further, holding rings 5 fitted to the input shaft 3 hold the input discs 4 in directions that they move away from each other.

An output portion 8 has output members 6 with sprocket gears formed on their circumferences and output discs 7 as the torque transmitting members supported by the output member 6 so as to be rotatable as one-piece. The out put portion 8 is provided in the middle of the input shaft 3 in the axial direction, and is rotatably supported relative to the input shaft 3. A concavely curved raceway portion 7a is formed in one side of each input disc 7 opposing to the raceway portion 4a of the input disc 4. The output shaft 10 of the variator 1 transmitting power to driving wheels is arranged in parallel with the input shaft 3, and has a pair of sprocket wheels 10a at positions corresponding to the output members 6. The output member 6 and the sprocket wheels 10a are engaged with a chain 9, and power is taken out to the output shaft 10.

The output disc 7 is assembled so as to allow small movements in axial direction relative to the output member 6. A back-up plate is arranged in the back of each output disc 7 with clearance. The clearance is sealed by a casing 12 and a seal (not shown). The output disc 7 is thrust toward the input disc 4 opposing thereto by applying hydraulic pressure to the clearance, and a predetermined axial end load is applied.

A space between the raceway portion 4a of the input disc 4 and the raceway portion 7a of the output disc 7 opposing each other is formed as a toroid-shaped space. Three disc-shaped rollers 13 (only two of them are shown) as the torque transmitting members, which rotate in press-contact with raceway portions 4a, 7a, are provided uniformly in circle in the toroid-shaped space. Each roller 13 is rotatably supported by a carriage 14. The axis of its rotation can be tilted by the carriage 14. The carriage 14 is actuated in the direction that roller 13 is thrust and pulled by applying a driving force of hydraulic pressure.

In the variator 1, a pair of input discs 4 transmits torque to the respective output discs 7 via six rollers 13. When transmitting torque, the rollers 13 are subjected to reaction. The driving force applied to the carriage 14 supports the reaction. If the reaction does not balance with the torque necessary to drive the output disc 7, the roller 13 changes its axis angle to balance them. For example, when a force which thrusts or pulls the carriage against the driving force of hydraulic pressure is occurred by a variation of driving load, acceleration or deceleration by an accelerator pedal, the axis angle of the roller 13 changes (see two-dot-dashed line in FIG. 1). Accordingly, transmission ratio changes up or down, and torque outputted from the variator 1 changes. That is, a variation of the ratio in the variator 1 is obtained only by increasing and decreasing the driving force applied to the carriage 14, and response to external resistance. The fluid, which forms an oil film between the roller 13 and each of the discs 4, 7 is supplied to the surface of the roller 13 via an internal path (not shown) of the carriage 14.

Figure 2:
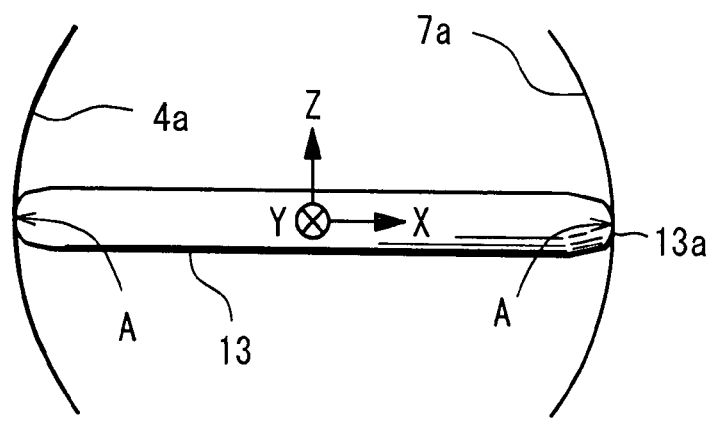
FIG. 2 is a diagram schematically showing a relation between each raceway portion of a disc and a roller in a variator.
Figure 2:
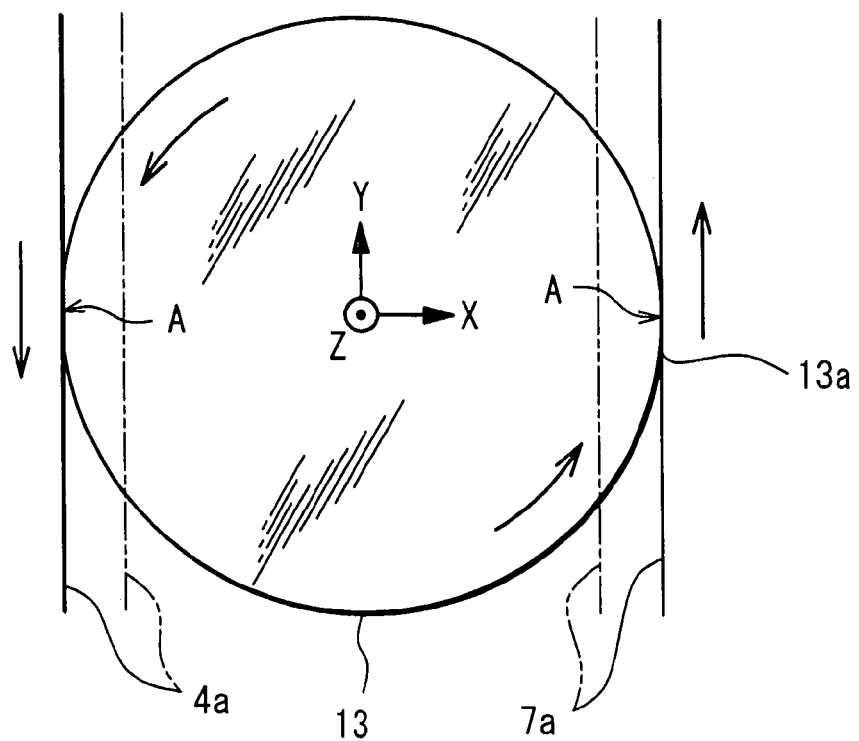

FIG. 2(a) is a diagram schematically showing a relation between each of the raceway portions 4a, 7a of the discs 4, 7 and the roller 13 in the variator 1 mentioned above. FIG. 2(b) is a diagram showing a view of the roller 13 and the raceway portions 4a, 7a from the Z-direction in FIG. 2(a), where the X-direction is parallel with the input shaft 3 (FIG. 1), and the Y-direction is a tangential direction of the roller 13 and perpendicular to the X-direction, and the Z-direction is perpendicular to both of the X-direction and the Y-direction. In addition, the Y-direction (including the direction of −Y) is a direction where the roller 13 rolls relative to the raceway portions 4a, 7a (in view of absolute position, the roller does not move but rotates).

Figure 3:
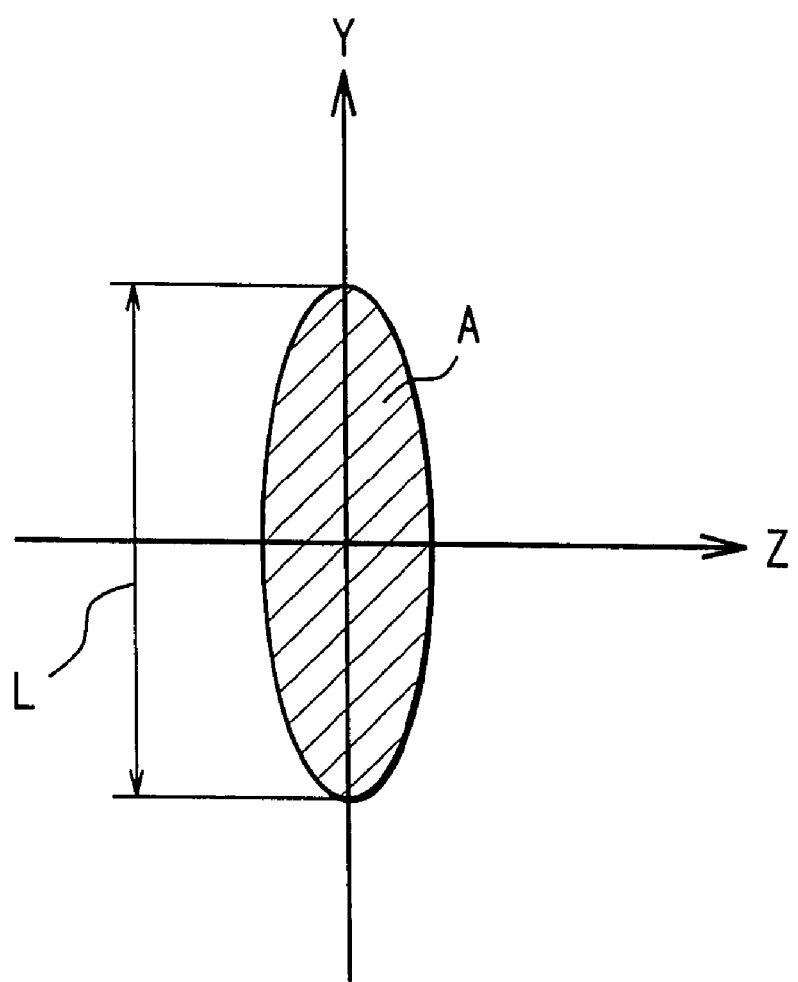
FIG. 3 is a diagram showing a contact ellipse at a traction contact portion between each raceway portion of a disc and a roller.

Under the condition that the predetermined axial end load is applied, the traction contact portion A, which is a contact portion between each of the raceway portions 4a, 7a and the roller 13 via the oil film, has the form of a contact ellipse in the Y-Z plane as shown in FIG. 3. The form and the dimension of the contact ellipse are determined by a radius of curvature of an end portion of the roller 13 in the X-Z plane shown in FIG. 3(a), a diameter of the roller 13 of the X-direction (Y-direction), and a curvature of the concave curve of each of the raceway portions 4a, 7a of the discs, a tilt of the roller 13 about the Y-axis, etc. (the geometric relation of the contact portion), the axial end load of the disc (contact load) etc., the Young's modulus, and the Poisson's ratio, etc. of material of the roller 13 and the discs 4, 7 (the mechanical characteristic value of the contact portion). Especially, the form of the contact ellipse (elliptically) is basically determined by the geometric relation. In addition, generally, the diameter of the roller 13, the curvature of the concave curve of the raceway portions 4a, 7a, and the contact load are determined by transmission ratio required in the transmission, required torque, and constraints of outer dimensions. Accordingly, under condition that these dimensions and the load are constant, when only the radius of curvature of the end portion of the roller 13 in the X-Z plane varies, increasing the radius of curvature elongates the contact ellipse in the Z-direction. On the other hand, decreasing the radius of curvature shortens the contact ellipse in the Z-direction.

In the toroidal continuously variable transmission mentioned above, the input disc 4, the output disc 7, and each roller 13 are formed of bearing steel for semi-high temperature, respectively. This bearing steel contains C: 0.8-1.5 wt %; Si: 0.5-2.5 wt %; Mn: 0.3-2.0 wt %; Cr: 1.9-2.5 wt %; Mo: 0.3-1.0 wt %; and more preferably C: 0.9-1.05 wt %; Si: 0.9-1.1 wt %; Mn: 0.4-0.5 wt %; Cr: 1.9-2.5 wt %; Mo: 0.4-0.5 wt %; and a total of 1.0 wt % or more of Si and Mo; with the balance being iron and unavoidable impurities. The reason that the bearing steel for semi-high temperatures contains the contents with the above range of materials is described as follows:

1) C: 0.8-1.5 wt %

C acts as an element strengthening martensite in the base material by solid-solution. C is included to obtain strength after quenching and tempering, whereby a rolling fatigue life is improved. Thus, if C is less than 0.8 wt %, the amount of C of solid-solution in the base material is insufficient, so that it can not obtain hardness HRC 58 necessary for bearings. On the other hand, if the amount of C is over 1.5 wt %, large carbide is produced at casting, so that it can reduce a fatigue life or shock resistance.

2) Si: 0.5-2.5 wt %

Si effectively acts as an element increasing resistance to softening in tempering and the hardness after quenching and tempering to improve a rolling fatigue life. In addition, Si acts as an element for deoxidation at melting capable of low-oxidation of the steel. However, if the added amount of Si is over 2.5 wt %, this reduces machinability and tenacity. For this reason, it is preferable that Si is added in the range 0.5-2.0 wt %, and more preferably the range 0.5-2.5 wt %.

3) Mn: 0.3-2.0 wt %

Mn acts as an element improving heat treating characteristics of the steel. This can improve tenacity and strength of the base material, martensite, and can effectively improve a rolling fatigue life. However, if the added amount of Mn is over 2.0 wt %, this reduces machinability and tenacity.

4) Cr: 1.9-2.5 wt %

Cr acts as an element making carbide stable. This can reduce the amount of C of solid-solution in the base material and can reduce occurrence of a white layer caused by diffusion of C. Accordingly, this can improve a life. In order to achieve the effects, at least 1.9 wt % of added amount is required. On the other hand, if the added amount of Cr is over 2.5 wt %, this causes not only a problem that large carbide is produced but also a problem that free-machining characteristics is reduced or the like.

5) Mo: 0.3-1.0 wt %

Mo is an element improving heat treating characteristics. This can improve strength and further can improve a rolling fatigue life. In addition, Mo forms stable carbide with fine structure. This can reduce diffusion of C, so that reduction of the rolling life cause by a structural change is prevented. In order to achieve the effects, 0.3 wt % or more of Mo is required. However, if its content is over 1.0 wt %, the machinability of the steel is reduced.

6) A Total of 1.0 wt % or more of Si and Mo

In order to obtain excellent hardness and high temperature rolling fatigue life characteristics after high temperature tempering, a total of 1.0 wt % or more of Si and Mo is required.

The raceway portion 4a of the input disc 4, the raceway portion 7a of the output disc 7, and circumferences 13a of the rollers contain a residual austenite ($\gamma$) in a range of depth Z=1.0L, where L is the major axis of a contact ellipse of the traction contact portion (see FIG. 3), is 15 wt % or less, more preferably 7-13 wt %, and the hardness of the range is HRC 58-62, more preferably 59-61. Thus, white structure, which causes a factor of a short life of the torque transmitting member, can be reduced.

Namely, the bearing steel is used under the condition after quenching and tempering, and the metal structure thereof is a mixed structure of martensite, a residual austenite and a sphere of carbide. When this material is used, the volume fraction of the residual austenite at the time of the completion of quenching and tempering is about 12%-19%. Generally, it is known that some amount of residual austenite improve a rolling fatigue life. However, regarding a toroidal continuously variable transmission, in the rolling member used under a high surface pressure condition, a residual austenite can be a source of a local structural change. This accelerates the occurrence of a white layer. For this reason, it is preferable that the residual austenite is 15 wt % or less, and more preferably 7-13 wt %.

In addition, since the rolling component used under rolling contact is generally used under a high stress such as thousands Mpa of contact surface pressure, the surface hardness is set to be HRC 60 or more. However, if hardness is over HRC 62, since the lattice strain of a material structure is high, and the density of dislocation, which is the lattice defect of the material, is also high, its structure becomes unstable. This tends to occur a white structure. On the other hand, if the hardness is lower than HRC 58, a normal rolling fatigue life is reduced. For the above reason, it is preferable that the hardness is HRC 58-62, more preferably HRC 59-61.

Further, in the case of rolling contact, it is known that the depth, in which the shear stress internally acting occurs, is 0.4-0.5b, where b is the minor axis of the contact ellipse of the contact portion. As a result of experiment, it is found that the depth, in which flaking caused by a white layer occurs, is shallower than 1.0b. Therefore, adjusting the amount of residual austenite can reduce white layer flaking.

Furthermore, it is preferable that the oxide particle size in the range of depth Z=1.0L from the surface of each of raceway portions 4a, 7a and each circumference of the roller 13a is less than 20 μm, more preferably 14-19 μm. Accordingly, decreasing the oxide particle size of the rolling contact portion can reduce the occurrence of flaking caused by the oxide as the source.

FIG. 4 is a diagram showing a method for producing the input disc 4. This method is similar to a conventional method except the heat treatment described below. That is, first, a blank B is formed by cutting an annular material K of bearing steel for semi-high temperature obtained by casting, etc. At that time, as shown in FIG. 4(a), the raceway portion 4a with a concave curve surface is formed in one side of the annular material K by turning with cutting tools so as to provide machining allowance, and another side and the circumference are formed in predetermined shapes by turning so as to provide machining allowance. Additionally, a spline hole 4c with a plurality of strips of spline slots is formed in the center of the annular material by cutting with a broach 21.

Next, the blank B obtained in the cutting mentioned above is subjected to heat treatment (FIG. 4(b)). In this heat treatment, tempering is performed at the temperature of 250° C. or more after quenching at the temperature of 860° C. Thus, setting the tempering temperature higher than conventional tempering temperatures (200-220° C.) can stably obtain the input disc 4 having 15 wt % or more of residual austenite in after the heat treatment. Moreover, the hardness is the value of HRC hardness calculated by the measurements of Vickers hardness.

The life-test conditions are as follows:
(1) The number of rotation of the input shaft 3 and the output shaft of the variator 1:2400 rpm (constant speed controlled by inverter control)
(2) Roller surface temperature: 120° C. (a constant temperature controlled by controlling the fluid temperature in an oil tank by measuring the surface temperature of the roller in proximity to the traction contact portion A with a thermocouple.)
(3) The output torque of output portion 8: 400 Nm
(4) Transmission ratio: 1
(5) Toroid radius Ra (FIG. 1): 55 mm
(6) Toroid radius Rb (FIG. 1): 50 mm
(7) Fluid (lubricating oil): SANTOTRAC50 of traction oil (Findett Corporation)
(8) Disc axial end load F1 (FIG. 1): 54545N
(9) Roller driving force F2 (FIG. 1): 1936N
(10) Outside diameter of the roller 13: 100 mm
(11) Radius of curvature of the end portion of the roller 13: 19 mm

TABLE 1

| | Annealing Temperature | Heat Treatment Subzero Treatment | Tempering Temperature | Residual γ (%) | Hardness (HRC) | Inclusion (μm) | Life (h) |
|---|---|---|---|---|---|---|---|
| Comparative Example 1 | 860° C. × 90 min. | Not Performed | 200° C. × 120 min. | 17 | 63.5 | 18 | 100 |
| Comparative Example 2 | 860° C. × 90 min. | Not Performed | 200° C. × 120 min. | 17 | 61.0 | 18 | 100 |
| Comparative Example 3 | 860° C. × 90 min. | Not Performed | 200° C. × 120 min. | 16 | 63.0 | 25 | 125 |
| Comparative Example 4 | 860° C. × 90 min. | Performed | 200° C. × 120 min. | 10 | 64.0 | 20 | 153 |
| Comparative Example 5 | 860° C. × 90 min. | Not Performed | 220° C. × 120 min. | 16 | 62.5 | 15 | 120 |
| Comparative Example 6 | 860° C. × 90 min. | Performed | 220° C. × 120 min. | 8 | 62.5 | 19 | 115 |
| Example 1 | 860° C. × 90 min. | Not Performed | 250° C. × 120 min. | 12 | 59.0 | 19 | 400 |
| Example 2 | 860° C. × 90 min. | Not Performed | 250° C. × 120 min. | 13 | 60.0 | 14 | 400 |
| Example 3 | 860° C. × 90 min. | Performed | 250° C. × 120 min. | 8 | 60.5 | 18 | 385 |
| Example 4 | 860° C. × 90 min. | Performed | 250° C. × 120 min. | 7 | 61.0 | 15 | 400 | the range of depth Z=1.0L from the surface of the raceway portion 4a and HRC 58-62 of hardness in the range.

After the heat treatment, the flanks of gear teeth of the spline hole 4c of the blank B are subjected to shaving by the broach 21 (FIG. 4(c)). After that, the raceway portion 4a of the one side, the circumference surface, and another side, etc. of the blank B is finished by turning (FIG. 4(d)). Thus, the input disc 4 can be obtained.

A method for producing of the output disc 7 and the roller 13 is similar to a conventional method except that tempering temperature in the heat treatment is 250° C. or more.

Table 1 shows the experimental result of the amount of residual austenite in the range of depth Z=1.0L from the surface of the raceway portion, the hardness in the range, the maximum oxide particle size, and the life of the discs of bearing steel for semi-high temperature obtained by tempering at the temperature 250° C. (examples 1-4) and the discs of bearing steel for semi-high temperature obtained by tempering at the temperature 200-220° C. (comparative examples 1-6). In addition, in examples 3, 4 and comparative examples 4, 6, subzero treatment is performed for 60 minutes at −70° C.

The amount of residual austenite in the range of depth Z=1.0L from the surface of the raceway portion, the hardness in the range, and the maximum oxide particle size according to the examples 1-4, in which the tempering was performed at the temperature 250° C., were more than or equal to 7 wt % and less than or equal to 13wt %, HRC 59.0-61.0, and 14-19 μm, respectively. As shown in the table 1, it is obvious that the life of these examples is improved 2.5-4.0 times as much as the comparative examples 1-6. In addition, the evaluation of life was based on the increase of vibrations in the testing equipment caused by the surface damage of the discs or the rollers.

In the embodiment, the whole of the input disc 4, the output disc 7 and the rollers 13 are formed of the bearing steel for semi-high temperature, respectively. However, only the raceway portion 4a, 7a of each of the discs 4, 7 and the circumference portion 13a of the roller 13, which are rolling contact portions, can be formed of the bearing steel for semi-high temperature, respectively. Additionally, at least one rolling contact portion of the raceway portions 4a, 7a and the circumference portion 13a can be formed of the bearing steel for semi-high temperature, in which the residual austenite in the range of depth Z=1.0L from the surface of the rolling contact portion is 15 wt % or less, more preferably 7-13 wt %, and the hardness in the range is HRC 58-62, more preferably HRC 59-61. Further, at least one roller 13, which is subjected to relatively higher load among the plurality of rollers, can be formed of the bearing steel for semi-high temperature. Moreover, although the toroidal continuously variable according to the above embodiment is described as a full-toroidal continuously variable transmission, it should be appreciated that the toroidal continuously variable according to the present invention can be applied to other toroidal continuously variable transmissions.

What is claimed is:

1. A toroidal continuously variable transmission comprising:
    an input disc having a concavely curved raceway portion in one side;
    an output disc having a concavely curved raceway portion opposing to the raceway portion of the input disc in one side; and
    a roller rotatably sandwiched between the raceway portions of the discs for transmitting torque between the discs by a traction force between the circumference of the roller and the raceway portion of each of the discs,
    wherein, at least rolling contact portion of at least one transmitting member of the input disc, the output disc and the roller is formed of a bearing steel which contains:
    C: 0.8-1.5 wt %;
    Si: 0.5-2.5 wt %;
    Mn: 0.3-2.0 wt %;
    Cr: 1.9-2.5 wt %;
    Mo: 0.3-1.0 wt %; and
    a total of 1.0 wt % or more of Si and Mo;
    with the balance being iron and unavoidable impurities; and
    wherein a residual austenite in a range of depth Z=1.0L, where L is the major axis of a contact ellipse of the traction contact portion, from the surface of the rolling contact portion is 15 wt: % or less, and the hardness of the range is HRC 58-62; and
    wherein, an oxide particle size in the range of depth Z=1.0L from the surface of the rolling contact portion formed of the bearing steel is less than 20 µm.

2. The toroidal continuously variable transmission according to claim 1, wherein an oxide particle size in a range of depth Z=1.0b, where b is the minor axis of the contact ellipse of the traction contact portion, from the surface of the rolling contact portion formed of the bearing steel from the surface of the rolling contact portion formed of the bearing steel is less than 20 µm.

3. The toroidal continuously-variable transmission according to claim 1, wherein an oxide particle size in a range of depth Z=0.4b-0.5b, where b is the minor axis of the contact ellipse of the traction contact portion, from the surface of the rolling contact portion formed of the bearing steel from the surface of the rolling contact portion formed of the bearing steel is less than 20 µm.

4. The toroidal continuously variable transmission according to claim 1, wherein the whole of the input disc, the whole of the output disc, and the whole of the roller are formed of the bearing steel, and the toroidal continuously variable transmission is a full-toroidal.

5. A toroidal continuously variable transmission comprising:
    an input disc having a concavely curved raceway portion in one side;
    an output disc having a concavely curved raceway portion opposing the raceway portion of the input disc in one side; and
    a roller rotatably sandwiched between the raceway portions of the discs for transmitting torque between the discs by a traction force between the circumference of the roller and the raceway portion of each of the discs,
    wherein at least a rolling contact portion of at least one transmitting member of the input disc, the output disc and the roller is formed of a bearing steel which contains:
    C: 0.8-1.5 wt %;
    Si: 0.5-2.5 wt %;
    Mn: 0.3-2.0 wt %;
    Cr: 1.9-2.5 wt %;
    Mo: 0.3-1.0 wt %; and
    a total of 1.0 wt % or more of Si and Mo;
    with the balance being iron and unavoidable impurities; and
    wherein a residual austenite in a range of depth Z=1.0L, where L is the major axis of a contact ellipse of the traction contact portion, from the surface of the rolling contact portions, is 7-13 wt %, and the hardness of the range is HRC 59-61, and an oxide particle size in the range is 14-19 µm.

6. The toroidal continuously variable transmission according to claim 5, wherein, an oxide particle size in the range of depth Z=1.0b, where b is the minor axis of the contact ellipse of the traction contact portion, from the surface of the rolling contact portion formed of the bearing steel from the surface of the rolling contact portion formed of the bearing steel is less than 20 µm.

7. The toroidal continuously variable transmission according to claim 5, wherein, an oxide particle size in the range of depth Z=0.4b-0.5b, where b is the minor axis of the contact ellipse of the traction contact portion, from the surface of the rolling contact portion formed of the bearing steel from the surface of the rolling contact portion formed of the bearing steel is less than 20 µm.

8. The toroidal continuously variable transmission according to any of claims 5, 6 and 7, wherein, the whole of the input disc, the whole of the output disc, and the whole of the roller are formed of the bearing steel, and the toroidal continuously variable transmission is of full-toroidal.

9. A method for producing the torque transmitting member of claim 1 or 5 comprising the steps of:
    forming a predetermined shape of blank formed of the bearing steel;
    tempering the blank at a temperature of 250° C. or more after quenching; and finishing the heat-treated blank.

* * * * *